(12) United States Patent
Surti

(10) Patent No.: US 8,836,712 B2
(45) Date of Patent: Sep. 16, 2014

(54) FILTERING MECHANISM FOR RENDER TARGET LINE MODIFICATION

(75) Inventor: Prasoonkumar Surti, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 918 days.

(21) Appl. No.: 13/004,950

(22) Filed: Jan. 12, 2011

(65) Prior Publication Data

US 2012/0176390 A1 Jul. 12, 2012

(51) Int. Cl.
*G09G 5/36* (2006.01)
*G06T 1/60* (2006.01)

(52) U.S. Cl.
CPC ........................................ *G09G 5/36* (2013.01)
USPC .......................................... 345/557; 345/530

(58) Field of Classification Search
CPC .................. G09G 5/36–5/366; G09T 1/60

USPC ................................................. 345/557, 530
See application file for complete search history.

(56) References Cited

U.S. PATENT DOCUMENTS

| 7,760,804 B2 | 7/2010 | Ruttenberg et al. |
| 2004/0257373 A1* | 12/2004 | Doyle et al. ................. 345/537 |
| 2010/0231600 A1 | 9/2010 | Kaufman et al. |

OTHER PUBLICATIONS

PCT/US2011/067954 Search Report with Written Opinion of the International Searching Authority mailed Jun. 25, 2012 (9 pgs).

* cited by examiner

*Primary Examiner* — Jacinta M Crawford
(74) *Attorney, Agent, or Firm* — Trop, Pruner & Hu, P.C.

(57) ABSTRACT

Modification messages may be filtered to reduce the load on a message channel between a render cache and a frame buffer compression. A group of cache lines may be checked to see whether both a subspan request hits an unlit bit and a modify message was already sent. If so, the modification message may be filtered.

20 Claims, 2 Drawing Sheets

FILTERING MECHANISM FOR RENDER TARGET LINE MODIFICATION

BACKGROUND

This relates generally to graphics processing and, particularly, to rendering images.

In rendering, an image is represented by primitives, such as triangles or other polygons. A render target is established in a frame buffer. The render target is a destination surface in memory where render results are written. The render cache is a cache in which pixel color and depth information is written prior to being written to memory and where the prior pixel destination attributes are read in preparation for blending and depth tests.

Allocation is the process of allocating a cache line in the render cache. In some cases, the allocation happens for every 2×2 pixel group written from a pixel shader. The group of 2×2 pixels is called a subspan. An unlit bit in a subspan is a pixel that is not enabled in a group of 2×2 pixels.

Typically, in order to save power and improve performance, a frame buffer compression technique is used. The technique relies on tracking unmodified or recently rendered cache lines in the render cache. The unmodified lines can be displayed directly from a compressed buffer.

DETAILED DESCRIPTION

In accordance with some embodiments, cache line modifications are communicated to a frame buffer compression using a narrow interface called a message channel. During rendering, without any line modification filtering, the message channel can be oversubscribed by these modification messages. However, in some embodiments, line modification messages that are unnecessary can be filtered or compressed.

Figure 1:
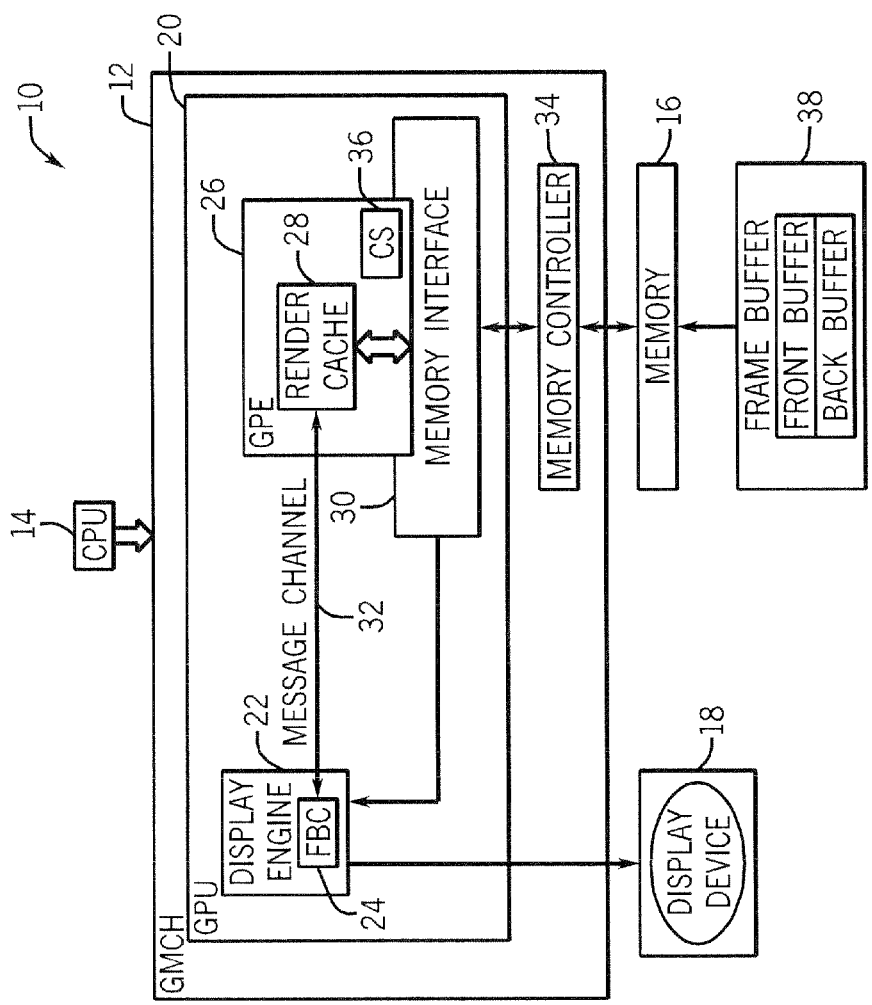
FIG. 1 is a schematic depiction of one embodiment of the present invention.

Referring to FIG. 1, an architecture for a computer 10 may include a central processing unit (CPU) 14, coupled to a graphics memory controller hub (GMCH) 12. The GMCH is a system memory controller with an integrated graphics device, called a graphics processing unit (GPU). Of course, other memory and processor architectures can be utilized and the one depicted in FIG. 1 is an example only.

The GMCH includes a graphics processing unit 20 which, in turn, includes a display engine 22. The display engine 22 includes a frame buffer compression 24 which is coupled by a message channel 32 to a graphics processing engine 26. The graphics processing engine may perform the bulk of the graphics processing in a graphics processor. It includes both three dimensional immediate fixed function pipelines, a command streamer unit 36 that feeds them, and other subsystems that provide computations required by the various graphics pipelines.

The graphics processing engine 26 may include the render cache 28. The render cache is a cache in which pixel color and depth information is written, prior to being written to memory, and where prior pixel destination attributes are read in preparation for blending and depth test.

Thus, the message channel 32 connects the render cache 28 to the frame buffer compression 24. Normally, the render target is the frame buffer 38. The command streamer 36 manages the use of 3D immediate pipelines by performing switching between the pipelines and forwarding command streams to the currently active pipelines.

The graphics processing unit 20 also includes a memory interface 30 which includes various caches. The memory interface (MI) 30 interfaces with the memory controller 34 in the GMCH 12 and with an external memory 16. A portion of the memory 16 makes up the frame buffer 38. In some embodiments, the frame buffer may include a front buffer which holds what is currently being displayed and one or more back buffers which hold the information that is going to be displayed and is being rendered ahead of its actual display. Thus, in multiple frame buffers, there may be several back buffers, even though only one is depicted in FIG. 1.

The display engine 22 drives the display on the display device 18, which could be a monitor or a television, as two examples.

Typically, a render cache sends a message to the frame buffer compression for each subspan that passes through allocation logic. By sending the modification messages only after processing some number of lines that include many subspans, it is possible to filter some of those messages or to compress them. Thus, in one embodiment, the modification messages are only sent at 16 line granularity. Messages within those 16 lines that are redundant, since the last compression of the frame buffer, can be filtered instead of being sent.

To this end, the render cache may include a displayable buffer to filter modification messages. In order to prevent allocation stalling, while still allowing the frame buffer compression to stall modification messages, the render cache may include two distinct types of bits. The first type of bit is an allocation array of bits that is set by the allocation logic when it receives a subspan request that hits an unlit bit. The second set of bits is contained in a message array that is set once the corresponding modify message has already been sent once in the cycle to the frame buffer compression. If the corresponding bits in both arrays are already set, then the message to the frame buffer compression will be filtered in one embodiment. This allows multiple pending messages to the frame buffer compression, which messages may be held by the displayable buffer, while still filtering redundant messages and preventing allocation stalling because allocation messages can still be sent as well.

Thus, the allocation and message array bits have four possible configurations. The allocation array bit may be zero and the message array bit may be zero when both bits are not set. No allocation for this 16 line segment was seen since the last frame buffer compression. Thus, this is a reset. After sending a clean status to the frame buffer compression, all the locations in the displayable buffer are reset to this state.

The next possibility is that the corresponding allocation array bit is one or set and the corresponding message array bit is zero. This means that a valid allocation was seen for at least one pixel in the 16 line segment. However, no modification message has been sent to the frame buffer compression yet. Bits in this state need to be sent via a modify message so that filtering is not possible.

The next possibility is that both the array and message bits are set. Thus, there was a valid allocation seen for at least one pixel in this 16 line segment and a modify message has already been sent to the frame buffer compression. There is no need to send any more messages for these bits until the next clean message is sent and this line is modified again. Therefore, in this case, filtering is used.

The final possibility is that the allocation array bit is zero and the message array bit is one or set. This is not a valid value and an error may be generated in some embodiments.

The render cache determines the current line number based on the y address and y offset in some embodiments. Address bits [10:4] of the final y address may be used to modify or set the corresponding bit in the allocation array. This modification is marked only when the base address matches the frame buffer compression base address register, as explained hereinafter. The render cache makes sure that the modification is marked only when at least one pixel mask is lit in the allocated subspan.

The render cache sends modification messages to the frame buffer compression only when the secondary message array indicates that a modification is pending. On the pending modification, the render cache can collapse more modifications to effectively filter them. The render cache also includes pending messages to the frame buffer compression as part of its idle determination for purposes of sending a clean message to the frame buffer compression.

For purposes of informing the frame buffer compression that the render data is in memory, the render cache and the frame buffer compression handle both front buffer rendering and back buffer rendering in some embodiments. In front buffer rendering, the rendering is done from the front buffer and the contents of the front buffer are not cached in some embodiments. The render cache sends a clean message to the frame buffer compression where transitioning from a non-clean to a clean state. The clean state is one in which there are no dirty lines in the cache and all writes have been posted to the graphics arbiter of request. Once the clean message is sent, the render cache invalidates the filter bits and begins tracking new modifications to the render targets.

Back buffer rendering is the case where the render target is cached. A flush is needed to send the data to memory. Upon getting a memory interface (MI) flush, which pushes data out of the frame buffer, the render cache flushes and informs the command streamer that a flush has been completed. The command streamer informs the render cache if the completed flush is tied to a flush. The render cache masks opportunistic flush completions in this mode.

The message interface is assumed to be put into the command streamer. The render cache generates modify and clean information and provides it to the command streamer. The command streamer posts these messages to the frame buffer compression on behalf of the render cache.

Figure 2:
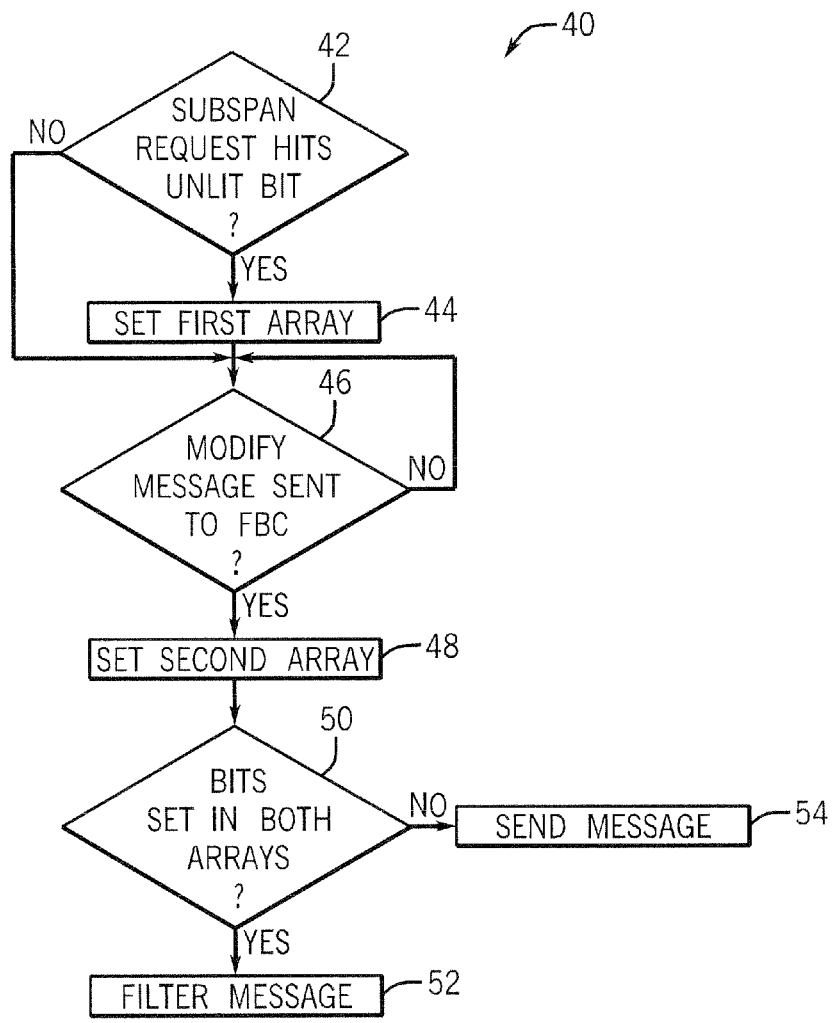
FIG. 2 is a flow chart for one embodiment.

Referring to FIG. 2, a sequence is depicted for filtering modification messages. The sequence 40 begins by determining if a subspan request hits an unlit bit, as indicated at diamond 42. If so, the corresponding bit in a first array is set, as indicated in block 44. The first would be the allocation array in one embodiment. Next, a check at diamond 46 determines whether a modified message has already been sent to a frame buffer compression for the given set of lines. If so, a bit in the second array is set, as indicated in block 48. The second array may be the message array in one embodiment.

Finally, a check at diamond 50 determines whether corresponding bits have been set in both arrays. If so, then the message is filtered, as indicated in block 52 and, otherwise, the modification message is sent, as indicated in block 54.

In the case of a software implementation, the pertinent code may be stored in any suitable semiconductor, magnetic, or optical memory, including the main memory 16 or any available memory within the graphics processor. Thus, in one embodiment, the code to perform the sequences of FIG. 2 may be stored in a non-transitory machine or computer readable medium, such as the memory 16 or the graphics processor controller hub 12, and may be executed by the processor 14 or the graphics processor 12 in one embodiment.

FIG. 2 is a flow chart. In some embodiments, the sequences depicted in this flow chart may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 2.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   processing a group of render target cache line modifications;
   after processing the group of modifications, determining whether modification messages are needed for every instance where a render target cache line was modified; and
   filtering unneeded render target line modification messages.

2. The method of claim 1 including filtering modification messages over a channel between a frame buffer compression and a render cache.

3. The method of claim 1 including processing a group of 16 lines.

4. The method of claim 1 including setting a first bit in a first array when a subspan request hits an unlit bit.

5. The method of claim 4 including setting a second bit in a second array when a modification message has already been sent.

6. The method of claim 5 including filtering a modification message when the first and second bits are set.

7. A non-transitory computer readable medium storing instructions to enable a computer to:
   keep track of render target cache line modifications; and
   use information about render target cache line modifications to filter render target cache line modification messages.

8. The medium of claim 7 further storing instructions to process a group of render target cache modifications.

9. The medium of claim 8 further storing instructions to process a group of 16 lines.

10. The medium of claim 8 further storing instructions to determine whether modification messages are needed for every instance where a render target cache line was modified after processing the group of modifications.

11. The medium of claim 7 further storing instructions to filter modification messages over a channel between a frame buffer compression and a render cache.

12. The medium of claim 7 further storing instructions to set a first bit in a first array when a modification message has already been sent.

13. The medium of claim 12 further storing instructions to set a second bit in a second array when a subspan request hits an unlit bit.

14. The medium of claim 13 further storing instructions to filter a modification message when both the first and second bits are set.

15. A processor comprising:
   a render cache including a buffer to filter cache line modification messages;
   a frame buffer compression; and
   a message channel between said frame buffer compression and said render cache.

16. The processor of claim 15, said buffer to determine when a subspan request hits an unlit bit.

17. The processor of claim 16, said buffer to determine when a modify message has already been sent.

18. The processor of claim 17, said buffer to process a plurality of cache line modification requests as a group.

19. The processor of claim 18 wherein said group includes a plurality of subspans.

20. The processor of claim 15, said processor to send a modification message for a group only when both a subspan request hits an unlit bit and a modify message has not already been sent once for the group.

* * * * *